United States Patent
Matsushima et al.

(10) Patent No.: US 7,715,188 B2
(45) Date of Patent: May 11, 2010

(54) DISK ARRAY APPARATUS FOR PROVIDING EQUALIZED COOLING

(75) Inventors: Hitoshi Matsushima, Ryugasaki (JP); Takayuki Atarashi, Tsuchiura (JP); Yasumasa Nagawa, Kasumigaura (JP); Hiroshi Fukuda, Odawara (JP)

(73) Assignee: Hitachi, Ltd., Tokyo (JP)

( * ) Notice: Subject to any disclaimer, the term of this patent is extended or adjusted under 35 U.S.C. 154(b) by 403 days.

(21) Appl. No.: 11/346,327

(22) Filed: Feb. 3, 2006

(65) Prior Publication Data
US 2007/0025076 A1 Feb. 1, 2007

(30) Foreign Application Priority Data
Jul. 28, 2005 (JP) .............. 2005-218156

(51) Int. Cl.
*H05K 5/00* (2006.01)
*A47B 77/08* (2006.01)
*F28F 13/12* (2006.01)
*G11B 33/14* (2006.01)

(52) U.S. Cl. ............ 361/679.51; 361/679.49; 361/695; 454/184; 312/236; 165/122; 360/97.02; 360/97.03

(58) Field of Classification Search ......... 361/685, 361/687, 688, 695; 454/184; 312/236; 165/12; 360/97.02–97.03
See application file for complete search history.

(56) References Cited

U.S. PATENT DOCUMENTS

| 5,247,427 | A  | * | 9/1993  | Driscoll et al. ........ 361/685 |
| 5,414,591 | A  | * | 5/1995  | Kimura et al. ........ 361/695 |
| 5,851,143 | A  | * | 12/1998 | Hamid ................... 454/57 |
| 6,392,884 | B1 | * | 5/2002  | Chou ................... 361/687 |
| 7,046,513 | B2 | * | 5/2006  | Nishiyama et al. ........ 361/695 |
| 7,061,715 | B2 | * | 6/2006  | Miyamoto et al. ........ 360/97.03 |
| 7,269,006 | B2 | * | 9/2007  | Miyamoto et al. ........ 361/687 |
| 7,359,186 | B2 | * | 4/2008  | Honda et al. ........ 361/685 |
| 7,436,663 | B2 | * | 10/2008 | Matsushima et al. ........ 361/695 |
| 2005/0111136 | A1 | * | 5/2005 | Miyamoto et al. ........ 360/97.03 |
| 2007/0218826 | A1 | * | 9/2007 | Walsh et al. ........ 454/184 |
| 2008/0205004 | A1 | * | 8/2008 | Ueno ................... 361/701 |

FOREIGN PATENT DOCUMENTS

| JP | 05-054626   | 3/1993  |
| JP | 09-274791   | 10/1997 |
| JP | 2001-338486 | 12/2001 |
| JP | 2001-344961 | 12/2001 |

* cited by examiner

*Primary Examiner*—Zachary M Pape
(74) *Attorney, Agent, or Firm*—Antonelli, Terry, Stout & Kraus, LLP.

(57) ABSTRACT

A disk array apparatus includes a plurality of disk drives arranged in at least one disk drive line in a direction of an airflow, at least one shield plate, a housing containing the disk drives and the at least one shield plate therein, and flow passages arranged between an upper surface of the disk drives and an inner wall of the housing for enabling the airflow to pass through. The at least one shield plate is arranged between at least two of the disk drives of the at least one disk drive line for controlling the airflow on a downstream side of the flow passages.

6 Claims, 13 Drawing Sheets

DISK ARRAY APPARATUS FOR PROVIDING EQUALIZED COOLING

BACKGROUND OF THE INVENTION

The present invention relates to a disk array apparatus.

In the disk array apparatus, a large number of disk drives of a magnetic-type or an optical-type are contained within a housing to improve the reliability in data reservation. Those disk array apparatuses are connected through a high-speed network for exclusive use thereof, and they are operated by means of management software in the form of, SAM (Storage Area Network), NAS (Network Attached Storage), or an independent RAID (Redundant Array of Inexpensive Disks), for example.

Each of those disk drives, to be installed into those disk array apparatuses, is arranged to include a disk main body, comprising a magnetic disk, a drive motor, an actuator, etc., and connectors for use of electronic parts for control, etc. Main heat-generation sources in the disk drive include the drive motor, the actuator, and the electronic parts for control, in the form of a LSI. Heat generated from those parts is removed using cooling airflow generated by a cooling fan, which is attached on the housing of the disk array. If cooling capacity is deteriorated, the temperature of the disk drive goes up, generating temperature unevenness among the plurality of disk drives and increasing the possibility of erroneous operations or deteriorating reliability.

For example, the unevenness in temperature among the disk drives may cause a shift in timing of the electronic parts; i.e., a possibility of causing defects in the operation of the controller of the disk drive, or generating a delay in the time for data transmission. Also, a temperature increase in the disk drive may cause deterioration in a lubrication layer pasted upon the disk surface, and the disk can therefore be easily damaged.

Also, the magnetic disk, the drive motor, or the actuator, etc., included within an inside of the disk drive, defines an operating portion, and also defines a noise generating portion, at the same time. When installing a large number of disk drives, each having such a noise source, the probability of increased noises generated therefrom rises. Also, even noises generated from the fan for driving an airflow within the disk array apparatus cannot be neglected.

Consequently, within the disk array apparatus, there are two problems to be solved. One is to obtain equal cooling of the disk drives, and the other is to silence the noises of the disk drives and in the entire disk array apparatus.

With a conventional disk array apparatus, mounting the disk drives and the controller circuit on the same surface on a board is already known to provide an air-guide plate, thereby dividing the cooling airflow passages for the disk drives and the controller circuit (please see Japanese Patent Laid-Open No. HEI9-274794).

Also, with the conventional disk array apparatus, an arrangement is made to separate the airflow passage for the disk drives therein, and the airflow passage for the controller circuit therein, so as to equalize the cooling therebetween (please see Japanese Patent Laid-Open No. 2001-338486).

Further, with the conventional disk array apparatus, arranging the disk drives in a zigzag manner is already disclosed (please see Japanese Patent Laid-Open No. HEI5-54626).

Also, with the magnetic disk apparatus, a cooling controller plate for increasing the velocity of airflow passing by the side of a printed board is already disclosed(please see Japanese Patent Laid-Open No. 2001-344961).

With the conventional technology described in Japanese Patent Laid-Open No. HEI 9-274731, since the disk drives and the controller are mounted on the same board, the number of the disk drives which can be installed therein is restricted. Also, there is no problem in equalizing the temperature distribution among the disk drives.

With the conventional technology described in Japanese Patent Laid-Open No. 2001-338686, though the disk drives and the controller are mounted on the same board, and there is no problem in equalizing the temperature distribution among the disk drives as a plurality of the disk drives are installed aligned with the airflow direction.

With the conventional technology described in Japanese Patent Laid-Open No. HEI5-54626, although flow resistance is increased, because of acceleration upon mixing of the cooling air flowing on side surfaces of the disk drives, an improvement of the cooling characteristics of the disk drives can be obtained. However, when the disk drives are disposed within the cooling airflow path by a large number thereof, because of a large space above the disk drives, there is a problem that the cooling air downstream passes through the space above the disk drives, in particular in the zigzag arrangement where the flow resistance is large. Therefore, there is no problem in equalizing the temperature distribution among the disk drives.

With the conventional technology described in Japanese Patent Laid Open No. 2001-344961, although an improvement can be obtained in the cooling performance of the disk drive by itself, there is no disclosure of the structures for cooling a group of the disk drives as a whole, in particular, when a plurality of disk drives is disposed in the downstream side. Therefore, there is no problem of equalizing the temperature distribution among the disk drives.

Also, with those conventional technologies disclosed in the above Patent Documents, the structures for reducing the noises generated within the disk array apparatus are also disclosed.

BRIEF SUMMARY OF THE INVENTION

An object according to the present invention is to provide a disk array apparatus exhibiting the equalization of cooling among the disk drives, as well as reduction of noises within the apparatus.

For accomplishing the object mentioned above, according to the present invention, the disk array apparatus includes disk drives mounted in a plurality of lines in the direction of the airflow, a housing containing said disk drives therein and airflow passages provided between an upper surface of the disk drives and an inner wall of an upper surface of the housing, for allowing said airflow to pass through, wherein a dam is provided for narrowing said airflow, above said disk drives, on the downstream side of said flow passages.

Also, the object mentioned above is accomplished by the disk array apparatus, wherein the dam is made of a sound absorbing material, and the dam is attached on the inner wall of the upper surface of the housing.

Furthermore, for accomplishing the object mentioned above, a disk array apparatus according to the present invention includes disk drives which are mounted in a plurality of lines in a direction of the airflow, a housing containing the disk drives, and airflow passages provided between an upper surface of the disk drives and an inner wall of an upper surface of the housing for allowing said airflow to pass through. A shield plate is also provided for shielding the airflow passing through said disk drives in a downstream side of said flow passages. On the shielding plate are provided openings corresponding to shapes of the disk drives.

Also, the object mentioned above is accomplished by the disk array apparatus wherein the shield plate is so disposed as a plurality of spaces that is opened alternately in a direction of height in a front and in a rear of the disk drives.

In addition, the above object is accomplished, by the disk array apparatus wherein a heat sink is attached on one of sidewalls of each of the disk drives.

The object mentioned above is accomplished, by the disk array apparatus wherein a dummy disk drive is attached at a position where a functioning disk drive is not installed.

Thus, according to the present invention, it is possible to provide a disk array apparatus exhibiting an equal cooling of the disk drives, as well as silencing of the disk drives and/or the disk array apparatus.

BRIEF DESCRIPTION OF THE SEVERAL VIEWS OF THE DRAWING

Those and other objects, features, and advantages of the present invention will become more readily apparent from the following detailed description when taken in conjunction with the accompanying drawings wherein.

DETAILED DESCRIPTION OF THE INVENTION

Hereinafter, embodiments according to the present invention will be fully explained by referring to the attached drawings.

Explanation will be given about a first embodiment according to the present invention, by referring to FIGS. 1 to 3(b).

Figure 1:
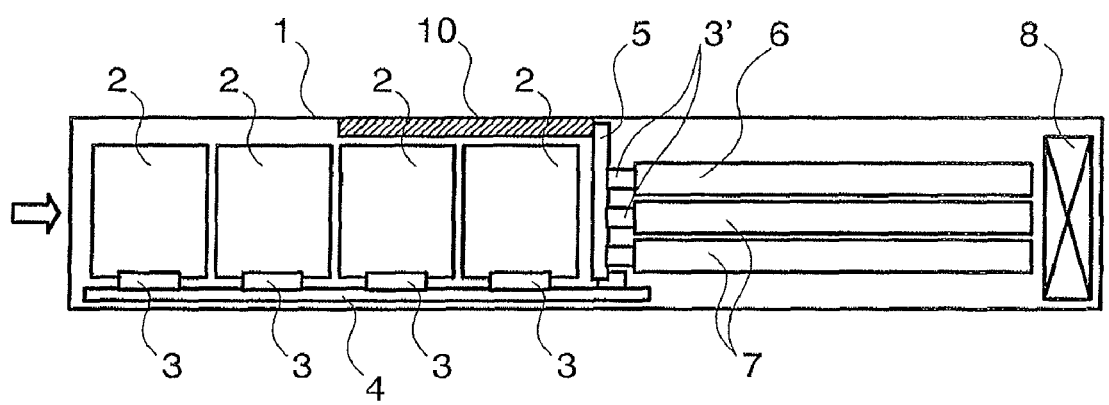
FIG. 1 is a cross-section view of the structures of the disk array apparatus, according to a first embodiment of the present invention.
Figure 2:
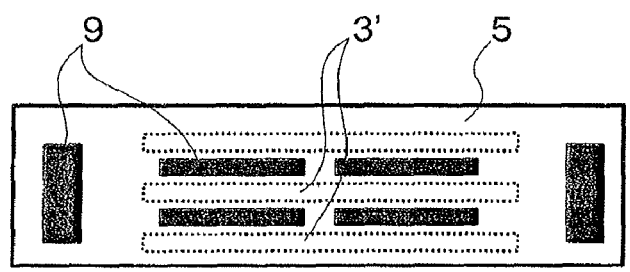
FIG. 2 is a brief structural view of a backboard in the first embodiment of the present invention.
Figure 3A:
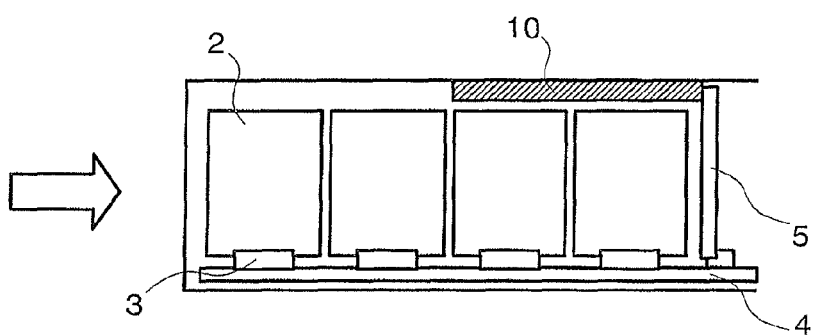
FIGS. 3(a) and 3(b) are enlarged partial views of the disk array apparatus, according to the first embodiment of the present invention.
Figure 3B:
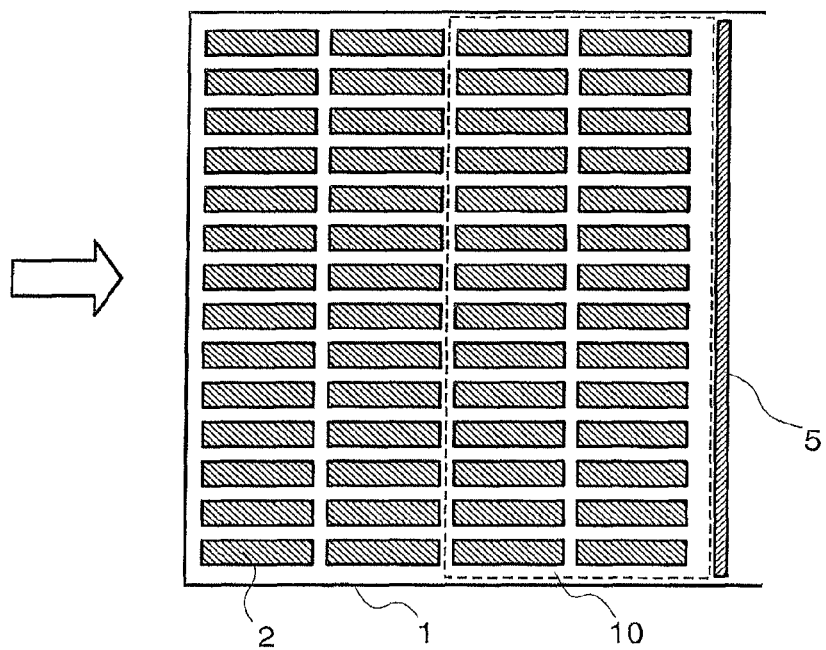

In the figures, within a housing 1 of the disk array apparatus, a portion for installing a plurality of disk drives 2 is disposed in the front, while an electric power source 6 and a controller circuit board 7 are installed in the rear portion thereof. Also, a fan unit 8 is provided at the end thereof. The disk drives 2 are connected onto a motherboard 4 through connectors 3. The motherboard 4 is connected to a backboard 5 with an aid of wiring (not shown in the figure). Also, an electric power source 6 and a controller circuit board 7 are connected onto the backboard 5 through connectors 3'. On the backboard 5, airflow orifices 9 are provided as shown in FIG. 2. Those airflow orifices 9 are provided so that the numerical apertures are approximately equal all over the backboard.

However, in the present embodiment, among the connectors 3 on the motherboard 4, a dummy (disk drive) is mounted in a position on which no disk drive is mounted. The dummy disk drive is adjusted so as to have the flow resistance equal to that of the disk drive 2, and it is comprised of a box having the outer sizes equal to that of disk drive 2. This also applies to other embodiments.

In the present embodiment, maintenance of the disk drive is performed by opening a cover, which is provided in a front upper portion of the housing 1, after drawing out the housing 1 from a container portion thereof. In the case where a multitude of disk drives are installed, as in the present case, it is necessary to arrange the space in order to allow the disk drives to be inserted/drawn out upwards.

In the present embodiment, above the disk drives 2 on the downstream side, a flow path throttle 10 (i.e., a dam) is provided. This flow path throttle 10 includes a structure combining a sound absorbing material therein.

In such structures, cooling airflow driven by the fan unit 8 flows in from a front of the housing 1, and, after cooling the respective disk drives 2, it passes through the backboard 5. Further, after cooling the electric power source 6 and the control board 7, it is discharged from a rear side of the housing 1. However, because the numerical apertures of the airflow orifices 9 provided in the backboard 5 are substantially equal, flow velocity of the airflow through the different cross-sections of the flow passage is substantially constant. In this case, since being heated by the heat-generation bodies disposed in the way thereof, the cooling airflow exhibits raises in temperature as it comes downstream. For this reason, the temperature of the disk drives 2 in the downstream side is elevated relative to that of the disk drives in the upstream side. However, in the present embodiment, due to the function of the flow path throttle 10, which is provided upwards of the disk drives 2 in the downstream side, the flow passage is narrowed. The cooling airflow, being cut off from escape, flows into the side of the disk drives 2 and impacts the disk drives 2 with increasing airflow velocity. Therefore, cooling is improved, particularly for the disk drives 2 on the downstream side. Thus, it is possible to reduce the unevenness or fluctuation of temperatures of the disk drives 2 between the upstream side and the downstream side.

Also, since the numerical aperture of the airflow orifices 9, which are provided in the backboard 5 in large numbers, is substantially equal to the cross-section of the flow passage, and dummies are mounted in the positions where the disk drives 2 are not mounted, the flow velocity through the disk drives 2 is nearly constant along the cross-section of the flow passage; i.e., it is possible to reduce the unevenness in temperatures of the disk drives 2 in the direction of flow.

According to the present embodiment, it is possible to bring the respective disk drives 2 into preferable thermal conditions while aligning the disk drives 2.

According to the present embodiment, since cooling can be made effective by means of the fan unit 8 having a small capacity thereof, it is possible to reduce noises from the fan. Also, the flow path throttle 10 incorporates the structures combining the sound absorbing material. Therefore, it is possible to efficiently absorb the noises generated by the respective disk drives 2.

Figure 4A:
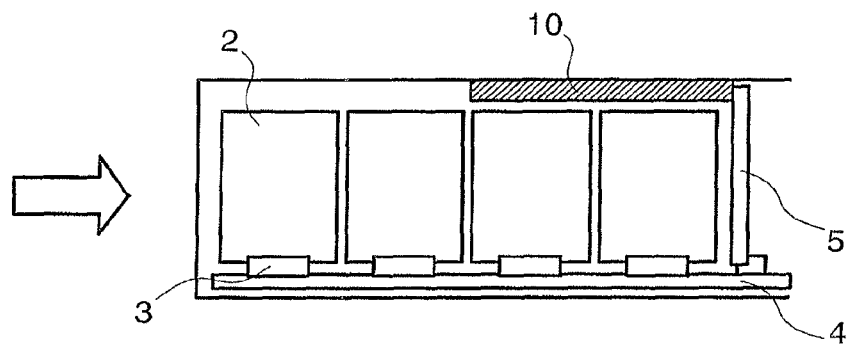
FIGS. 4(a) and 4(b) are enlarged partial views of the disk array apparatus, according to a second embodiment of the present invention.
Figure 4B:
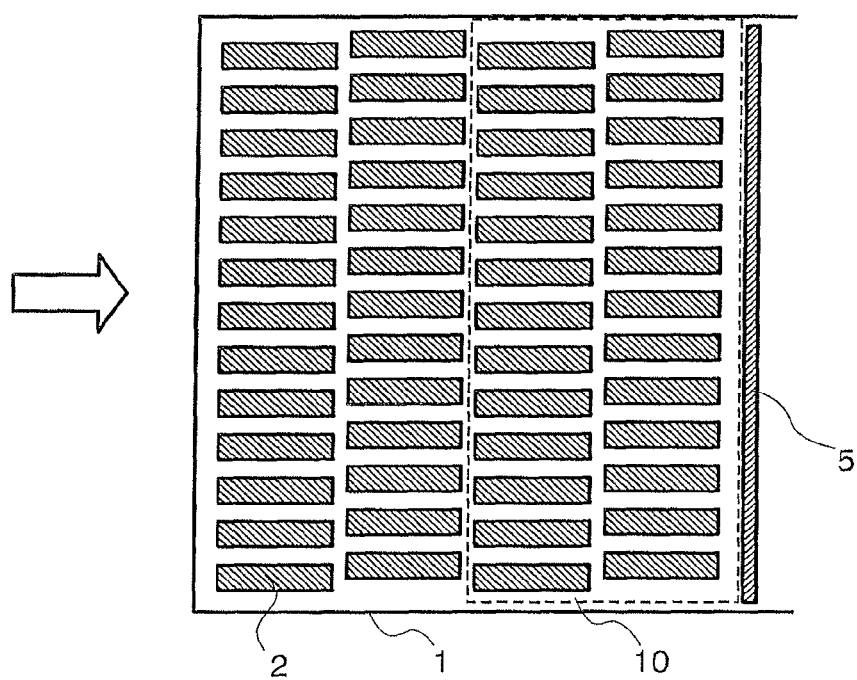

In FIGS. 4(*a*) and 4(*b*), the disk drives 2 are arranged the disk drives 2 are arranged in a zigzag manner, although increasing the airflow resistance thereof, mixing cooling airflow among the disk drives 2 can be accelerated. Therefore, further improvements in cooling performances can be obtained.

Further, the flow path throttle 10 includes materials having sound absorbing characteristics superior to that of the disk drives 2 in the downstream side. Thus, it is possible to solve a problem caused by having the large number of disk drives within the cooling flow passage when the flow of the cooling air on the downstream side bypasses into the upper space of the disk drives. Further, the cooling air flowing above the disk drives 2 but not being heated thereby, impacts onto the disk drives 2 while increasing the airflow velocity thereof. Therefore, the cooling of the disk drives 2 on the downstream side is enhanced. With this, it is possible to decrease the unevenness in the disk temperatures, in particular, between the disk drives 2 in the upstream and the downstream sides.

According to the present embodiment, since effective cooling can be obtained even if the fan unit 8 has a small capacity, it is possible to reduce the noise generated by the fan. Also, the flow path throttle 10 is structured to include sound absorbing materials. Therefore, it is possible to efficiently absorb the noise generated by the respective disk drives 2.

Figure 5A:
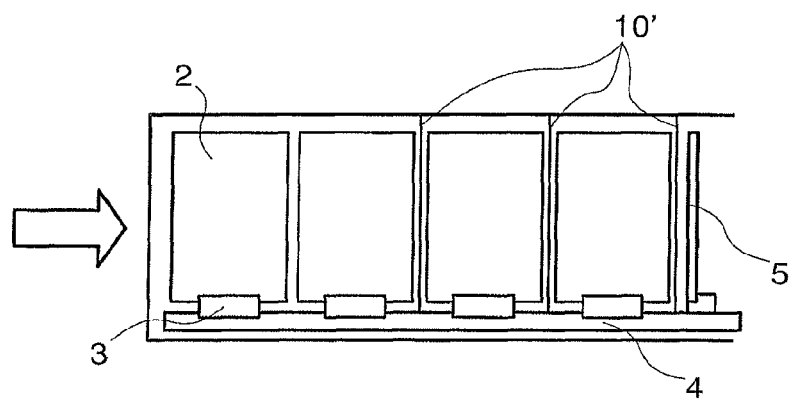
FIGS. 5(a) and 5(b) are enlarged partial views of the disk array apparatus, according to a third embodiment of the present invention.
Figure 5B:
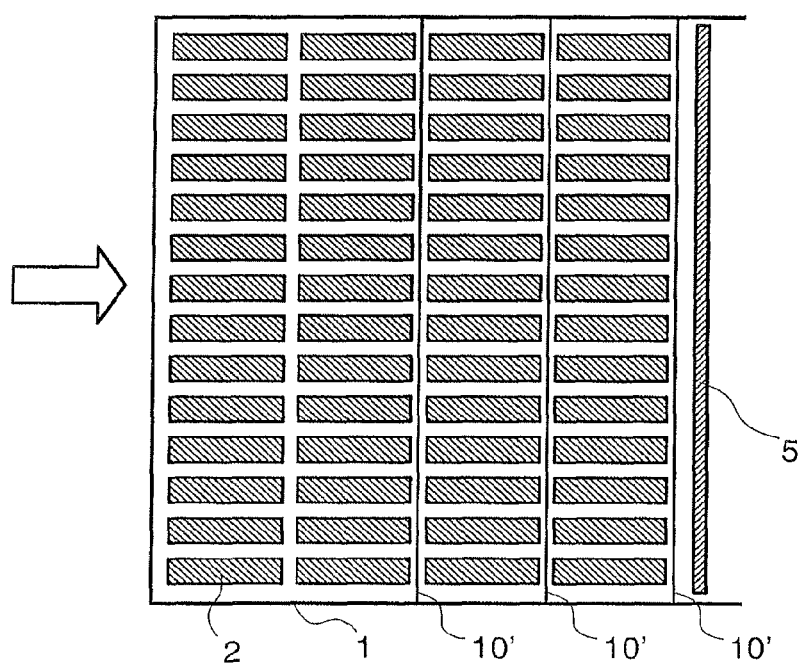
Figure 6A:
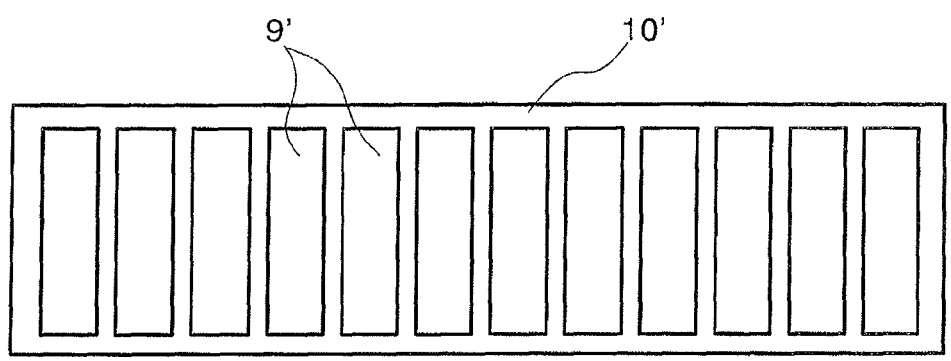
FIGS. 6(a) and 6(b) are views of the detailed structures of a throttle in flow passage, according to the third embodiment of the present invention.
Figure 6B:
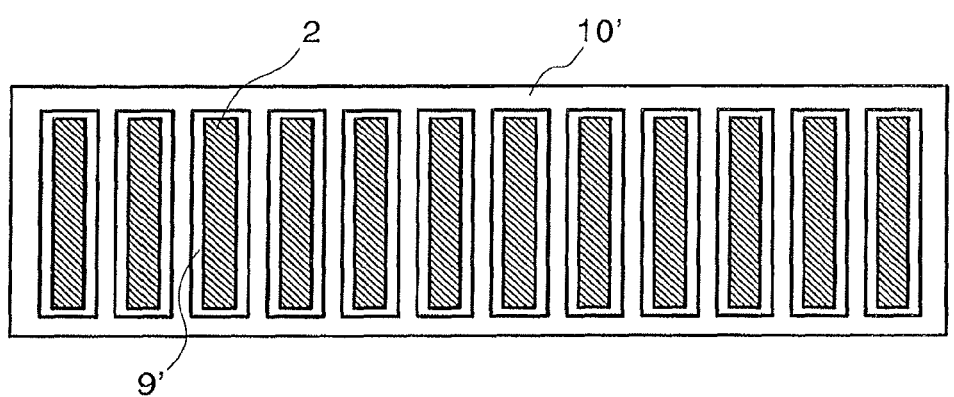

Within the present embodiment, the flow path throttle 10' is made from a plate containing a plurality of openings 9', and each of the openings 9' corresponds to the position of each disk drive 2, respectively. Namely, it is arranged so that the cooling airflow gathers in the outer periphery portions of the disk drives 2. In the embodiment shown in FIGS. 5(*a*) and 5(*b*), the flow path throttles 10' are provided in front and rear areas of the disk drives 2. Further, also in the present embodiment, the flow path throttle 10' is made of a material having sound absorbing characteristics.

In such structures, due to the function of the flow path throttle 10' provided in the front and the rear of the disk drives 2 on the downstream side, the flow passage is reduced or narrowed locally, and the cooling airflow is not excessively heated as it flows above the disk drives 2 and at a center of the disk drives 2, thereby impacting onto the disk drives 2 with increased flow velocity. Therefore, increased cooling can be obtained, particularly at front and rear edge portions, on the disk drives 2 on the downstream side. Thus, it is possible to reduce the unevenness or fluctuation of temperatures of the disk drives 2 between the upstream side and the downstream side.

Also, the numerical aperture of the large number of openings 9', which are provided on the flow path throttle 10', is substantially equal to the cross-section of the flow passage, and dummy disk drives are mounted on the portion where the disk drives 2 are not mounted. Therefore, the flow velocity through the disk drives 2 is nearly constant over the cross-sections of the flow. It is thus possible to reduce the unevenness in temperatures on the disk drives 2 in the direction of the airflow.

According to the present embodiment, it is possible to bring the respective disk drives 2 into optimum conditions while aligning the disk drives 2.

According to the present embodiment, since cooling can be made effectively by means of the fan unit 8 having a reduced capacity, it is thus possible to reduce the noise emitted by the fan. Also, the flow path throttle 10' contains structures which include sound absorbing materials. It is thus possible to efficiently absorb the noise generated from the respective disk drives 2.

Figure 7A:
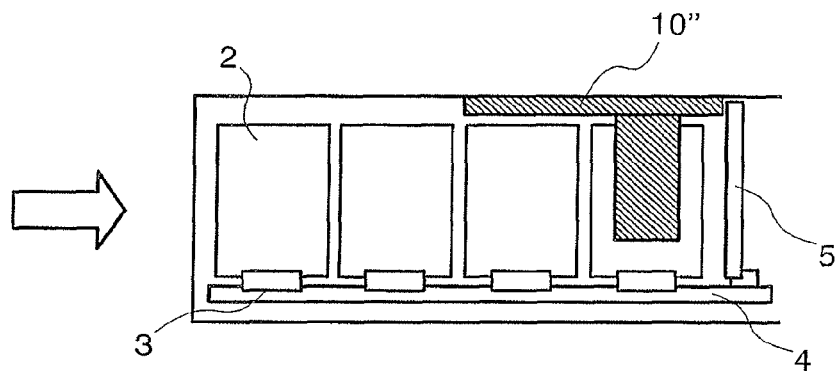
FIGS. 7(a) and 7(b) are enlarged partial views of the disk array apparatus, according to a fourth embodiment of the present invention.
Figure 7B:
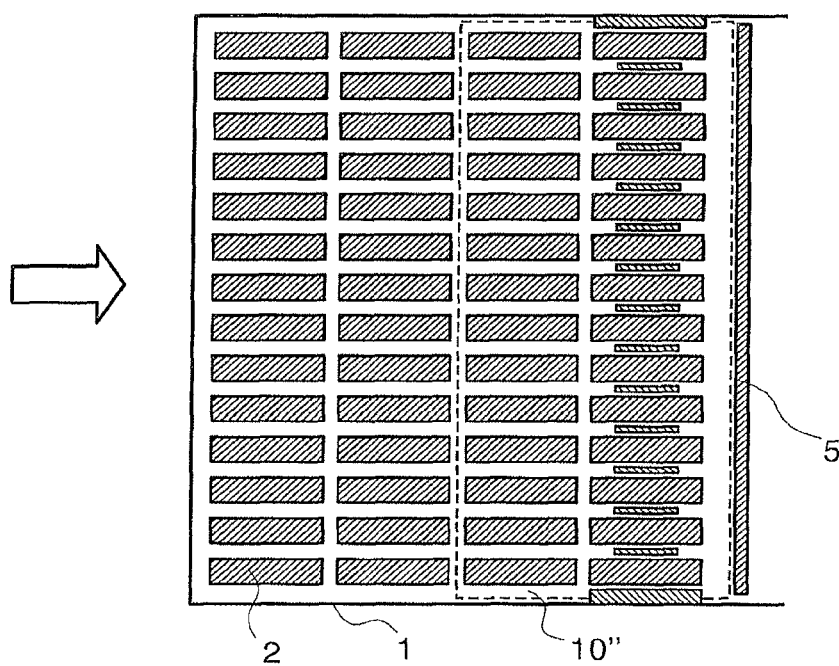
Figure 8:
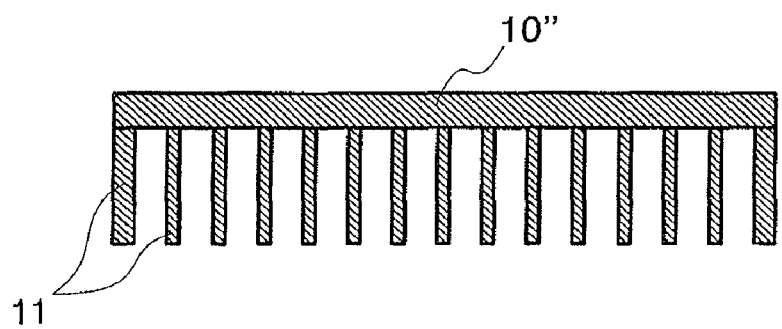
FIG. 8 is a view of the detailed structures of a throttle in flow passage, according to the fourth embodiment of the present invention.
Figure 9A:
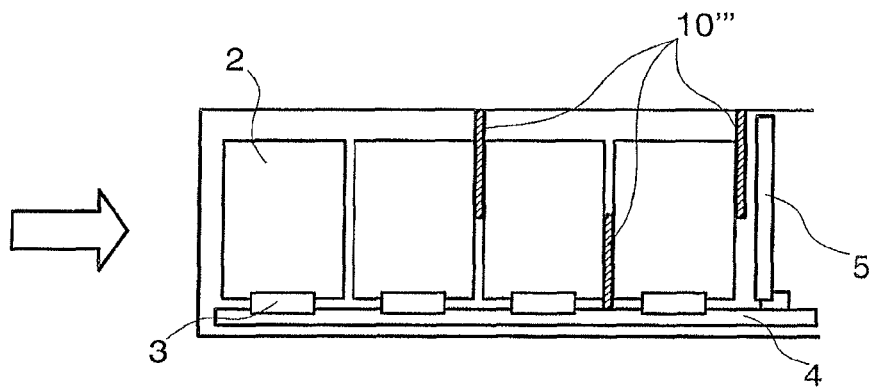
FIGS. 9(a) and 9(b) are enlarged partial views of the disk array apparatus, according to a fifth embodiment of the present invention.
Figure 9B:
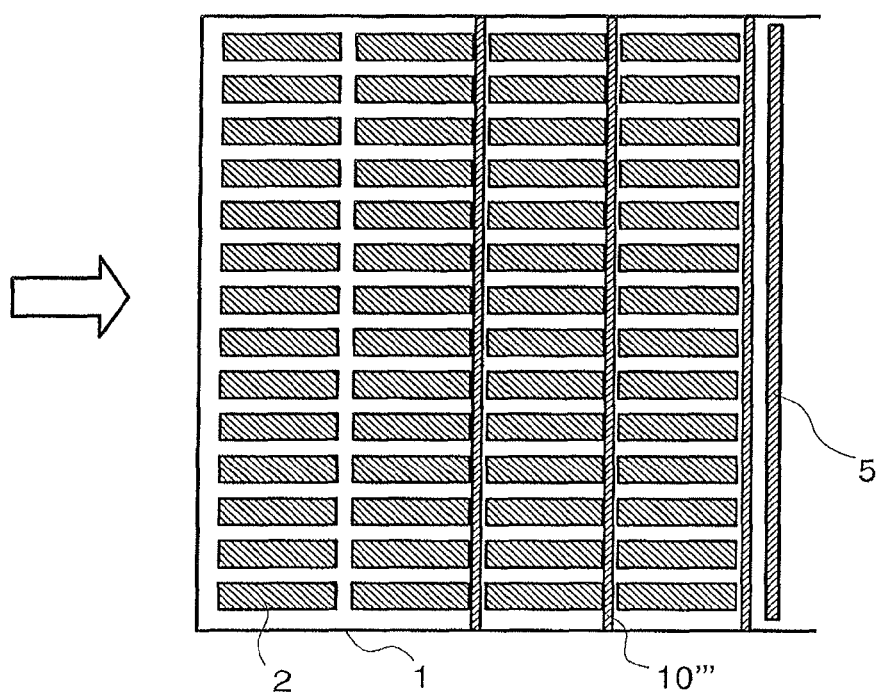

In FIGS. 7(*a*) and 7(*b*) and FIG. 8, the flow path throttle 10" is made from a plate having a plurality of projections 11 on a lower side thereof, and the positions of those projections 11 correspond to a central position between the disk drives 2, respectively. Within the embodiment shown in FIGS. 7(*a*) and 7(*b*), the projections 11 are provided at the positions of the disk drives 2 on the most downstream side. Namely, it is so arranged that the cooling airflows come around the disk drives 2 on the most downstream side, in particular. Further, also in the present embodiment, the flow path throttle 10" incorporates material having sound absorbing characteristics.

In the present embodiment, due to the function of the flow path throttle 10" which is positioned above the disk drives 2 on the downstream side, the flow passage is reduced or narrowed for the disk drives 2 on the third line and thereafter, and the cooling airflow is not heated. Flowing above the disk drives 2, it impacts the disk drives 2 while increasing the airflow velocity. Therefore, increased cooling can be obtained on the disk drives in the downstream side. Further, with the disk drives 2 on the fourth line, the cooling airflow flows around the disk drives 2, being further accelerated by means of the projection 11. Therefore, the cooling obtained on the disk drives 2 is enhanced.

It is thus possible to reduce the unevenness in the increase in temperatures, in particular, between the disk drives 2 in the upstream and the downstream sides of the airflow.

Also, due to the functions of the projections 11, which are provided on the flow path throttle 10", since the flow resistance is controlled when the cooling airflow flows through the flow passage, it is possible to reduce the unevenness in temperatures on the disk drives 2, in particular, in the direction of the flow.

According to the present embodiment, it is possible to bring the respective disk drives 2 into improved conditions while aligning the disk drives 2 with the flow.

According to the present embodiment, since effective cooling can be achieved by means of the fan unit 8 having a reduced capacity, it is possible to reduce the noises coming from the fan. Also, the flow path throttle 10" includes the structures combining the sound absorbing material. Therefore, it is possible to effectively absorb the noises generated from the respective disk drives 2.

Flow path throttles 10''', according to the present embodiment, each being made from a plate having on opening portion therein, are located in the front and rear of two lines of disk drives in the downstream side, so that a space can be opened in the direction of height. Also, in the present embodiment, the flow path throttles 10''' materials having sound absorbing characteristics.

In such a structure, due to the functions of the flow path throttles 10''', which are provided in the front and the rear of the disk drives on the downstream side, the cooling airflow flowing above and between the disk drives 2, impacts the disk drives 2 while flowing in a zigzag manner in up and down directions while increasing airflow velocity. Therefore, improved cooling can be obtained on the disk drives 2 on the downstream side. Therefore, it is possible to reduce the unevenness in the increase of temperature, in particular, between the disk drives 2 on the upstream and the downstream sides.

According to the present embodiment, it is possible to bring the respective disk drives 2 into improved conditions while aligning the disk drives 2.

According to the present embodiment, since cooling can be made efficient by means of the small capacity of fan unit 8, it is possible to reduce the noise from the fan. Also, the flow path throttle 10''' incorporates sound absorbing materials. Therefore, it is possible to efficiently absorb the noise generated from the respective disk drives 2.

Figure 10A:
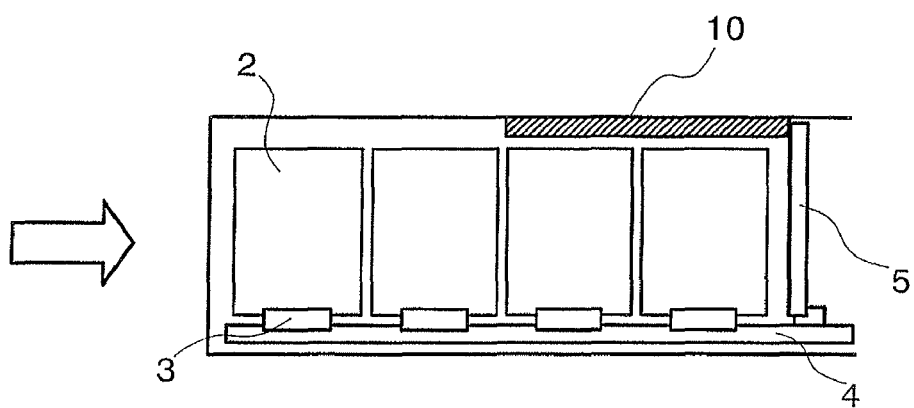
FIGS. 10(a) and 10(b) are enlarged partial views of the disk array apparatus, according to a sixth embodiment of the present invention.
Figure 10B:
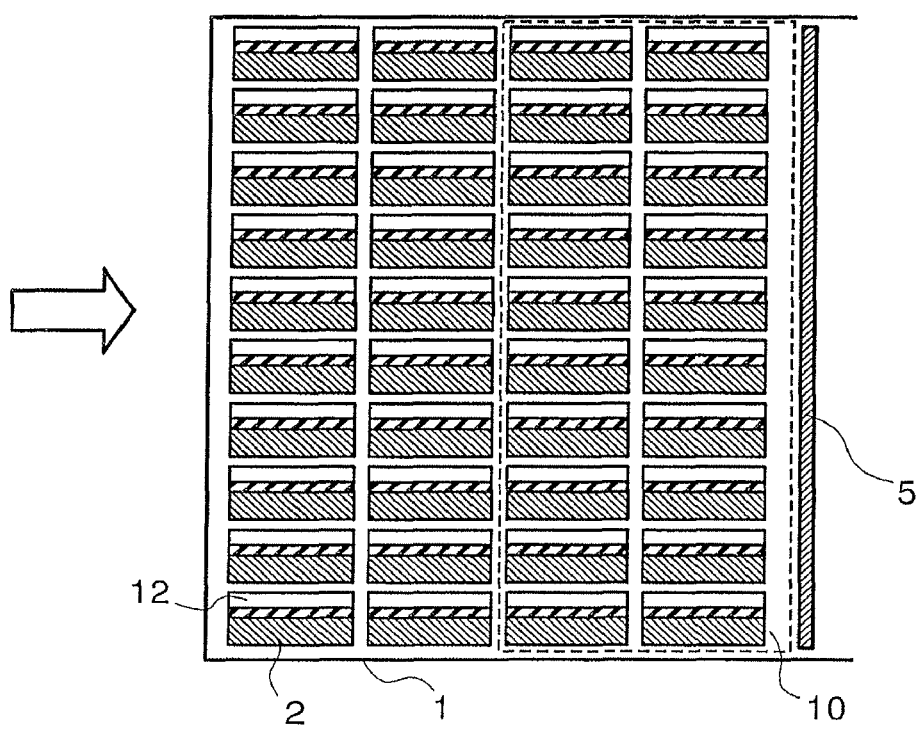
Figure 11:
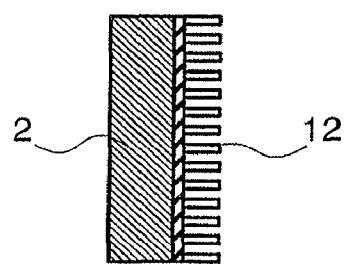
FIG. 11 is a view of the detailed structures of a disk drive, according to the sixth embodiment of the present invention.

In FIGS. 10(*a*) and 10(*b*), and FIG. 11, a heat sink 12 is attached on one of the sidewalls of the disk drive 2. However, in the present embodiment, only one heat sink 12 is shown having a large number of plates aligned. However, the heat sink should not be restricted to this shape, in order to increase the heat radiation area.

Also, in the present embodiment, above the disk drives 2 on the downstream side, a flow path throttle 10 is arranged, which incorporates a material having sound absorbing characteristics in a manner similar manner to the first embodiment.

In such the structures, due to the functions of the heat sink 12, desired cooling of the respective disk drives 2 can be achieved. Further, due to the functions of the flow path throttle 10, which is provided above the disk drives on the downstream side, the flow passage is reduced or narrowed, not heated cooling airflow, flowing above the disk drives 2, impacts the disk drives 2 with increased airflow velocity. Therefore, further improved cooling can be obtained on the disk drives 2 on the downstream side. It is thus possible to reduce the unevenness in the increase of temperature, in particular, between the disk drives 2 on the upstream and downstream sides.

Further, if it is so designed that the number of pieces of fins of the heat sink should be increased for the disk drives 2 on the downstream side, it is further possible to significantly reduce the unevenness in the increase of temperatures, in particular, between the disk drives 2 on the upstream side and downstream sides.

According to the present embodiment, since cooling can be made efficient by means of the fan unit 8 having a small capacity thereof, it is possible to reduce the noise coming from the fan. Also, the flow path throttle 10 incorporates the structures combining the sound absorbing material. Therefore, it is possible to absorb the noise generated from the respective disk drives 2 with high efficiency.

Figure 12:
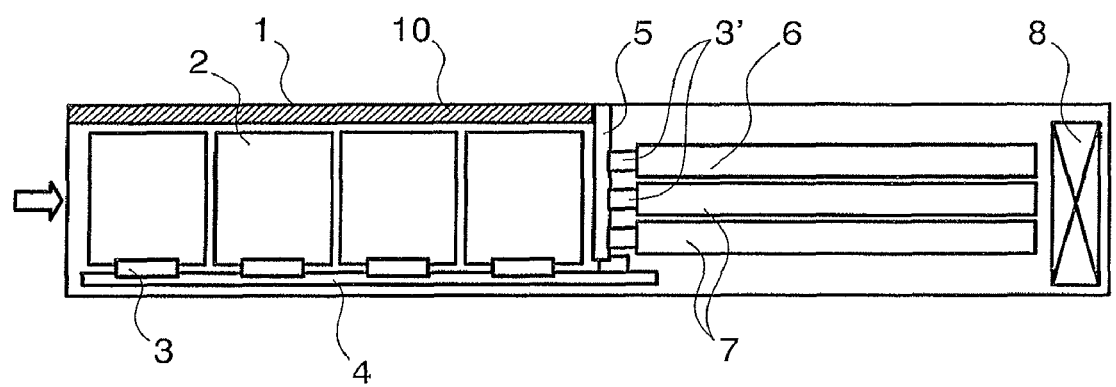
FIG. 12 is a the cross-section view of the structures of a disk drive, according to a seventh embodiment of the present invention.

In FIG. 12, above all the disk drives 2 are provided the flow path throttles 10, which are made of a material having the sound absorbing characteristics.

With such a structure, since no cooling air passes above the disk drives 2, improved cooling can be obtained for the respective disk drives 2. Also, efficient cooling can be achieved by means of the fan unit 8 having a small capacity. Therefore, it is possible to reduce the noise coming from the fan. Further, the flow path throttle 10 includes the structures combining sound absorbing material. Therefore, it is possible to absorb the noise generated from the respective disk drives 2 with high efficiency.

Figure 13:
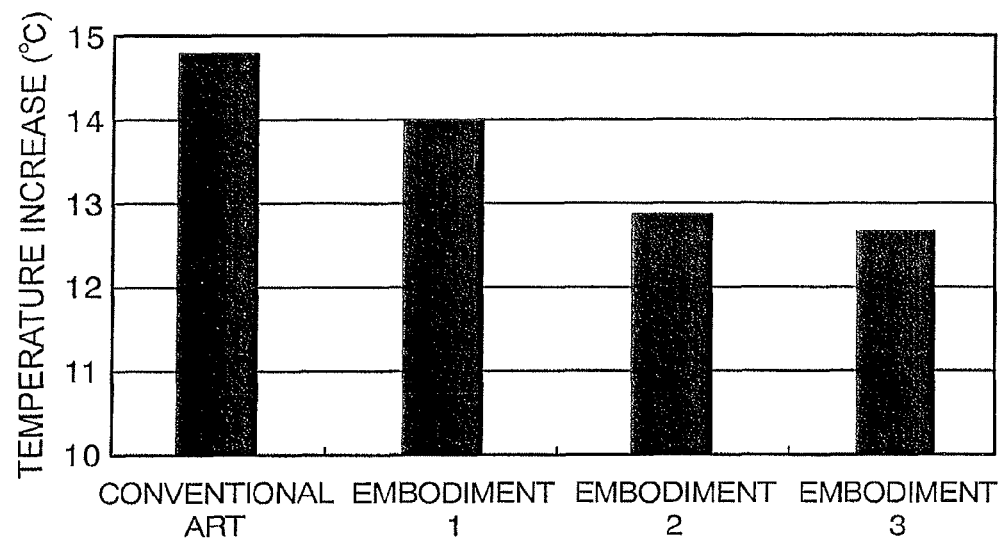
FIG. 13 shows a graph illustrating the effects of the present invention.
Figure 14:
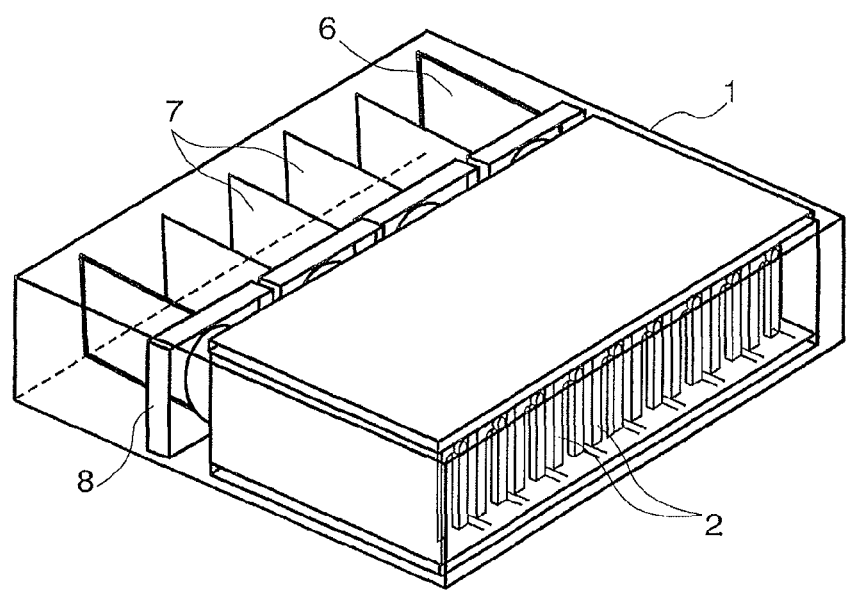
FIG. 14 is a perspective view of the disk array apparatus, according to the present invention.

Regarding FIG. 13, upon receiving a command transmitted from the controller, the status of the disk drives 2 changes to "Ready", "Not Ready" or "Power OFF". Of those, when the disk drives 2 in the "Ready" condition, they are able to receive a command for reading/writing data, which is transmitted from the controller. The disk drives 2, operating under the "Ready" condition, are rotating at the rotation speed necessary for conducting the reading/writing of data. FIG. 13 shows the maximum values of an increase in temperature on the disk drives 2 while idling when no data is read/written under the "Ready" condition. For the disk array apparatus, it is customary for the maximum value of the increase in temperature to be about 15° C. Therefore, cooling of the disk drive 2 cannot be conducted under the condition of reading/writing of data. According to the present invention, more efficient cooling can be obtained, cooling can be conducted upon the disk drives 2 when reading/writing data can be achieved. For example, in embodiment 3, cooling can be achieved, even when all the disk drives 2 are operating on a load equal or greater than 50% of the maximum load thereof. If the disk drives increase in number, there is a negligible probability that all the disk drives 2 operate under maximum load condition.

Thus, in the case of the disk array apparatus according to the present invention, it is possible to improve the cooling performances of the disk drives and to suppress the unevenness of temperature, which in turn improves reliability and extends the lifetime of the disk drives, while enabling installation of disk drives at high density and obtaining a large capacity and high speed of the disk array apparatus. In addition, it is also possible to provide a disk array apparatus exhibiting a low level of noise.

Figure 15:
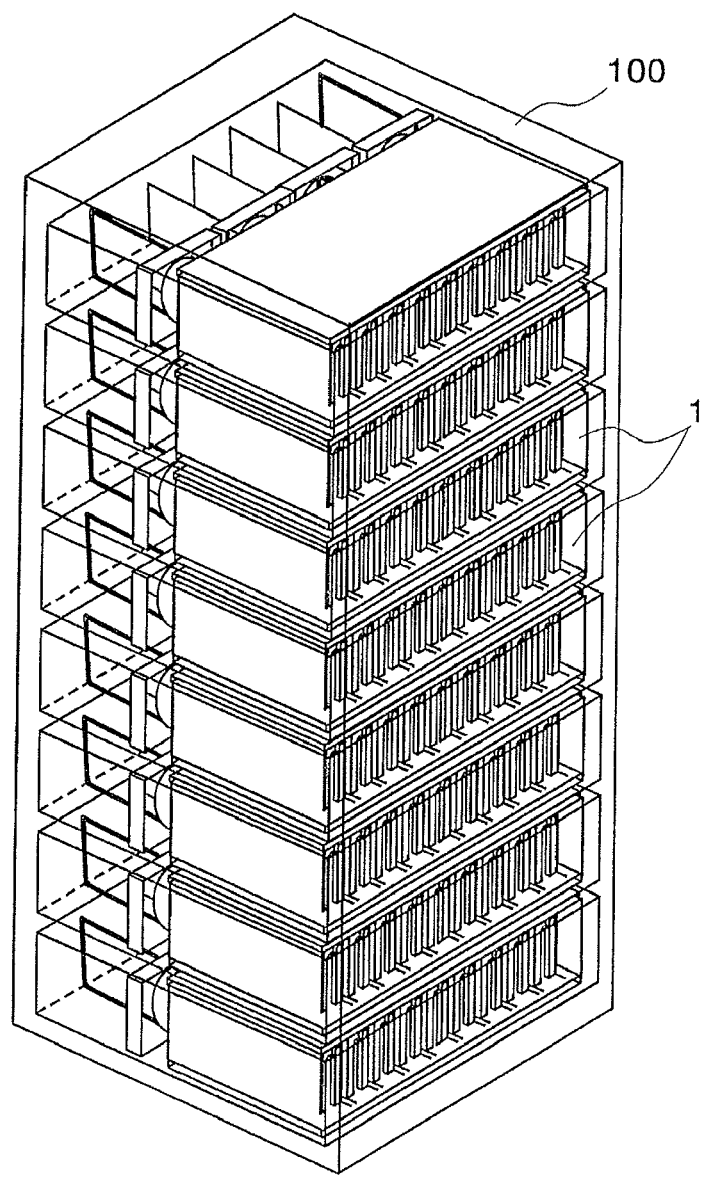
FIG. 15 is a perspective view of a system of the disk array apparatus, according to the present invention.
Figure 16:
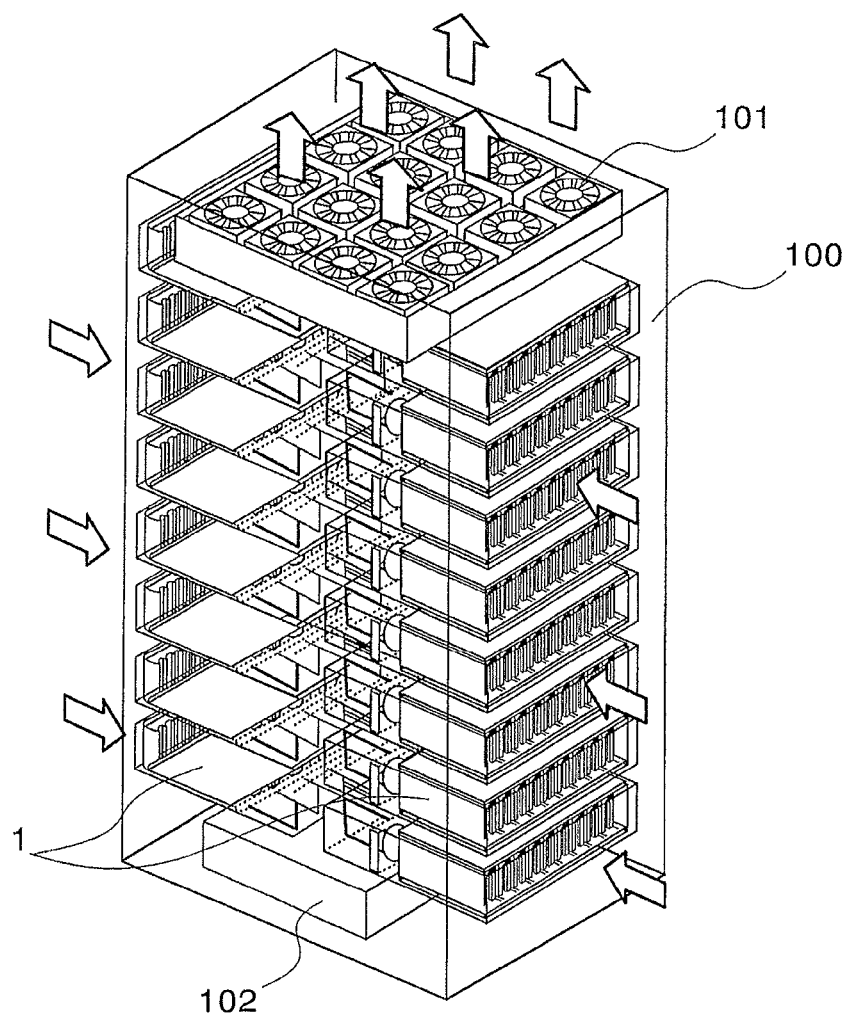
FIG. 16 is also a perspective view of a system of the disk array apparatus, according to the present invention.

An eighth embodiment according to the present invention is shown in FIGS. 15 and 16. In the present embodiment, the housings 1 of the disk array apparatuses, which are described in embodiments 1 to 7, are installed within the inside of a system housing 100, where a plurality of disk drives are arranged in the vertical direction.

FIG. 15 shows an example of applying a standard rack as the system housing 100, in which a plurality of housings 1 are arranged vertically. With such structures, since cooling can be efficiently obtained by means of the fan unit 8 having a small capacity, it is possible to reduce the noise coming from the fan.

In the embodiment shown in FIG. 16, a plurality of housings 1 is vertically installed on the front and rear surfaces (i.e., on both sides) of the system housing. Also, within the system housing 100, a system fan unit 101 and a system electric power source 102 are provided. With such a structure, since efficient cooling can achieved by means of the small capacity of fan unit 8, it is possible to reduce the noise coming from the fan, as well as heat discharged from the respective housings 1 can be smoothly discharged outside of the system housing 100 due to the system fan units 101.

The present invention may be embodied in other specific forms without departing from the spirit, essential features or characteristics thereof. The present embodiment is therefore to be considered in all respects as illustrative and not restrictive. The scope of the invention is indicated by the appended claims rather than by the forgoing description, and the range of equivalency of the claims is therefore to be embraced therein.

What is claimed is:

1. A disk array apparatus comprising:
a plurality of disk drives mounted on a motherboard, and arranged in rows perpendicular to a direction of an airflow;
one or more shield plates;
a housing containing said disk drives and said one or more shield plates therein; and
airflow passages formed between an upper surface of said disk drives and an inner wall of said housing for enabling said airflow to pass through;
wherein each shield plate is disposed between adjacent rows of said disk drives on a downstream side of the airflow passages, for controlling the airflow on the downstream side of said airflow passages;
wherein one of said shield plates is arranged so as to maintain a first open space between a distal end thereof and said inner wall of said housing; and
wherein another of said shield plates is arranged so as to maintain a second open space between a distal end thereof and said motherboard, so that said first open space and said second open space alternate in said direction of the airflow.

2. The disk array apparatus as claimed in claim 1, wherein said shield plates incorporate a plurality of first open spaces and second open spaces corresponding to said rows of disk drives.

3. The disk array apparatus as claimed in claim 1, wherein said shield plates are provided with a plurality of openings corresponding to positions of said disk drives.

4. A disk array apparatus comprising:
a plurality of disk drives mounted on a motherboard, and arranged in rows perpendicular to a direction of an airflow;
a plurality of shield plates each provided between adjacent rows of disk drives; and
a housing which accommodates the disk drives and the shield plates, and which forms an airflow passage between the motherboard and a ceiling of the housing;
wherein at least one of said shield plates is mounted on the ceiling of the housing extending toward the motherboard to create a gap between a distal end thereof and the motherboard,
wherein at least another of said shield plates is mounted on the motherboard extending toward the ceiling of the housing to create a gap between a distal end thereof and the ceiling of the housing,
wherein the shield plates regulate the airflow passing through the airflow passage, via the gaps created by the shield plates in a front and a rear of one of the rows of disk drives.

5. The disk array apparatus as claimed in claim 4, wherein the shield plates are made of sound absorbing materials to absorb noise generated from the disk drives.

6. The disk array apparatus as claimed in claim 4, further comprising a heat sink mounted on one of sidewalls of the disk drives to remove heat generated from the disk drives.

* * * * *